US008834990B2

(12) United States Patent
Kim et al.

(10) Patent No.: US 8,834,990 B2
(45) Date of Patent: Sep. 16, 2014

(54) INTERIOR DESIGN FILM GIVING AN IMPRESSION OF THE APPEARANCE OF METAL

(75) Inventors: Mun Kyu Kim, Chungcheongbuk-do (KR); Yang Ilwan Cho, Chungcheongbuk-do (KR)

(73) Assignee: LG Hausys, Ltd., Seoul (KR)

( * ) Notice: Subject to any disclaimer, the term of this patent is extended or adjusted under 35 U.S.C. 154(b) by 646 days.

(21) Appl. No.: 13/003,534

(22) PCT Filed: Jul. 16, 2009

(86) PCT No.: PCT/KR2009/003932

§ 371 (c)(1), (2), (4) Date: Jan. 10, 2011

(87) PCT Pub. No.: WO2010/008225

PCT Pub. Date: Jan. 21, 2010

(65) Prior Publication Data

US 2011/0123778 A1 May 26, 2011

(30) Foreign Application Priority Data

Jul. 16, 2008 (KR) ........................ 10-2008-0069135

(51) Int. Cl.

| | |
|---|---|
| ***B32B 3/10*** | (2006.01) |
| ***B44F 5/00*** | (2006.01) |
| ***B44F 9/10*** | (2006.01) |
| ***B44C 1/22*** | (2006.01) |

(52) U.S. Cl.

CPC ... *B44F 9/10* (2013.01); *B44F 5/00* (2013.01); *B44C 1/22* (2013.01)

USPC ......................... 428/172; 428/195.1; 428/201

(58) Field of Classification Search

USPC ....................................... 428/195.1, 172, 201

See application file for complete search history.

(56) References Cited

U.S. PATENT DOCUMENTS

| | | | |
|---|---|---|---|
| 4,197,337 | A | 4/1980 | Di Biasi et al. |
| 4,918,800 | A | 4/1990 | Reafler |

FOREIGN PATENT DOCUMENTS

| | | | |
|---|---|---|---|
| CA | 2 262 218 | A1 | 8/2000 |
| CN | 2907504 | Y | 6/2007 |
| DE | 1917538 | | 10/1970 |
| JP | 11-34146 | A | 2/1999 |
| JP | 11-034146 | A | 2/1999 |
| JP | 2005-349818 | A | 12/2005 |
| JP | 2006-528917 | A | 12/2006 |
| KR | 10-0259198 | B1 | 3/2000 |
| KR | 10-2003-0087100 | A | 11/2003 |
| KR | 10-0481627 | B1 | 3/2005 |
| KR | 20-0400382 | Y1 | 11/2005 |
| KR | 2008-0034889 | A | 4/2008 |
| WO | WO 2005/009742 | A1 | 2/2005 |

OTHER PUBLICATIONS

Machine translation of JP H11-034146.*
JP H11-034146 Retreived on May 10, 2013.*

* cited by examiner

*Primary Examiner* — Bruce H Hess
*Assistant Examiner* — Christopher Polley
(74) *Attorney, Agent, or Firm* — McKenna Long & Aldridge, LLP

(57) ABSTRACT

Provided is a plastic interior film having an effect of metallic feeling. The interior film includes a base film; and a pattern layer having one or more pattern selected from a group of a hairline pattern, a mirror pattern, a bead blast pattern, an uneven pattern, an etching pattern and a vibration pattern.

8 Claims, 7 Drawing Sheets

INTERIOR DESIGN FILM GIVING AN IMPRESSION OF THE APPEARANCE OF METAL

This application is a National Stage Entry of International Application No. PCT/KR2009/003932, filed Jul. 16, 2009, and claims the benefit of Korean Application No. 10-2008-0069135, filed on Jul. 16, 2008, which is hereby incorporated by reference for all purposes as if fully set forth herein.

BACKGROUND OF THE INVENTION

1. Field of the Invention

The present invention relates to a plastic interior film having an effect of metallic feeling.

2. Description of Related Art

Generally, a metal plate (e.g., stainless or aluminum plate) is a high quality interior material which is used in inner and outer portions of a building; a home appliance like a refrigerator; an interior/exterior material for vehicle; or furniture, door and advertising board and the like.

The metal plate is treated by a glossing process so as to form various patterns on a surface of the metal plate or to reflect light. The stainless or aluminum plate treated by the glossing process has a desired pattern through chemical machining, polishing or bead blasting and the like so as to be used as an interior material.

In case that the metal plate is used as the interior material, there is an advantage in that it is possible to provide a luxurious appearance, but there is also some disadvantage in that it is difficult to perform a mechanical work such as cutting and bending and it is high-priced. In order to solve the problems, there have been various trials to provide an interior material which has an effect of metallic feeling as well as excellent workability and low price.

One of the trials, there is a method in which a hair line pattern is formed on a surface of a polyester-based plastic film by a polishing process, and a metallic gloss is provided through aluminum vacuum deposition and the like.

However, in the conventional method, the hair line pattern is formed in only one direction, and the direction is also limited to a direction of producing a base film (hereinafter, also called as "a length direction of the film" or "a longitudinal direction of the film"). There is a limitation in providing the effect of metallic feeling having various patterns.

In Korean Patent No.481,627, there is disclosed an interior film in which an effect of metallic feeling having various colors is embodied by forming in turn a transparent synthetic resin film layer, a coating layer containing aluminum flake and an opaque synthetic resin film. Further, in Korean Patent Laid-Open No.2003-87100, there is disclosed an interior film in which a synthetic resin base, a hard coat layer, a transparent ink layer, a metal deposition layer and a protective layer are formed in turn, and the transparent ink layer is formed by screen printing so as to show a hair line pattern.

However, even in case that the pattern is formed by the coating layer containing the aluminum flake or the screen printing, there is a limitation in forming a complicated pattern, such as flowers and cross stripes, on a stainless plate, and also since a glossiness of the formed pattern is greatly different from that of an actual metal, there is a limitation in showing the effect of the luxurious metallic feeing. Accordingly, it requires development of a new technique for embodying further enhanced effect of metallic feeling.

SUMMARY OF THE INVENTION

An embodiment of the present invention is directed to providing a plastic interior film which can provide an effect of metallic feeling equal to or higher than a metal material such as stainless steel and aluminum.

To achieve the object of the present invention, the present invention provides an interior film including a base film; and a pattern layer having one or more pattern selected from a group of a hairline pattern, a mirror pattern, a bead blast pattern, an uneven pattern, an etching pattern and a vibration pattern.

DESCRIPTION OF SPECIFIC EMBODIMENTS

Figure 1:
FIG. 1 is a photograph of an interior film having a flower pattern according to an embodiment of the present invention.

The present invention relates to an interior film which has one or more patterns selected from the group consisting of a hairline pattern, a mirror pattern, a bead blast pattern, a fine uneven pattern, an etching pattern and a vibration pattern.

The advantages, features and aspects of the invention will become apparent from the following description of the embodiments with reference to the accompanying drawings, which is set forth hereinafter.

A base film used in the present invention is not limited particularly, if the film is formed of a plastic material having facile processability such as cutting and bending. For example, the present invention may use one of a polyester film (e.g., PET film), a polymethyl methacrylate film, a polyvinyl chloride film, a polyethylene film, a polypropylene film, a polyvinyliden fluoride film and an ABS (Acrylate-Butadien-Styrene) film or a combination of two or more kinds thereof. Herein, the combination of two or more kinds of the films means a film in which two or more kinds of the films are stacked, and a film formed of a mixture of two or more kinds of the resins.

In the present invention, the base film has a thickness of 0.023~0.5 mm, preferably 0.03~0.2 mm. If the thickness of the base film is less than 0.023 mm, it is difficult to form various patterns on the film, or productivity thereof may be lowered. Further, if the thickness of the base film is more than 0.5 mm, handling property, processability and physical property such as adhesive force may be deteriorated, and also it is not preferable in the economic aspect.

An interior film of the present invention is formed on the base film as described above, and includes a pattern layer which embodies an effect of metallic feeing through various patterns. The pattern layer may be directly formed on the base film, in some cases, the pattern layer may be formed on a proper primer layer (e.g., general primer layer like acryl resin layer) disposed on the base film. Moreover, in the present invention, the pattern layer is directly formed on the base film or the primer layer, and other pattern layer formed on the base film by an indirect method such as the screen printing is excluded.

In the present invention, the pattern layer may include one of a hairline pattern, a mirror pattern, a bead blast pattern, a fin uneven pattern, an etching pattern and a vibration pattern, and a combination of two or more kinds of the patterns.

Herein, the "hairline" means a scratch having a depth and width of 1~50 μm. Preferably, the hairline pattern includes one of a one-directional hairline pattern, multi-directional hairline pattern, a non-directional hairline pattern and a circular hairline pattern, and a combination of two or more kinds of the patterns.

Herein, the "one-directional hairline pattern" means that the hairline pattern is formed in a direction (i.e., "the length direction of the film" or "the longitudinal direction of the film") parallel with a direction of the production process.

Further, the "multi-directional hairline pattern" means that the hairline pattern is formed at various angles from more than 0° to less than 360° with respect to the length or longitudinal direction of the film. That is, in the conventional plastic interior film, there is a case that the hairline is formed on the surface of the film so as to provide the effect of metallic feeling. In this case, the formation of the hairline is limited to a direction parallel with the length or longitudinal direction of the film, i.e., to only one direction. Since the hairline is formed in only one direction, it is impossible to embody the metallic feeling.

Therefore, the present invention is to embody the hairline in various directions, not the existing one direction. In other words, for example, the hairline pattern according to the present invention may be a complex hairline including one or more patterns selected from the group consisting of the multi-directional hairline including hairline formed perpendicularly to the length direction of the film; the non-directional hairline and the circular hairline.

Herein, the "complex hairline" means a pattern having one of the multi-directional hairline, the non-directional hairline and the circular hairline, or a combination of two or more kinds of the hairlines. The multi-directional hairline included in the complex hairline may be a hairline pattern formed in one direction (a hairline pattern formed at an angle within a range of more than 0° to less than 360° with respect to the length direction of the film), or a hairline pattern having a combination of multiple one directional and/or multi-directional hairline patterns. In the complex pattern, the formation directions of the hairline patterns may be equal to or different from each other.

In the present invention, since the hairline patterns having various directions and shapes are formed on the base film, it is possible to provide the interior film having the effect of metallic feeling. Further, in the present invention, one of the hairline pattern, the mirror pattern, the bead blast pattern, the fin uneven pattern, the etching pattern and the vibration pattern, or the combination of two or more kinds of the patterns may be further formed together with the hairline pattern, thereby providing the interior film having the abundant effect of metallic feeling similar to an actual metal material.

Hereinafter, various patterns formed on the interior film will be described in detail with reference to the drawings. FIG. 1 is a photograph of an interior film having a flower pattern according to an embodiment of the present invention, and FIGS. 2 to 5 are partially enlarged photographs of FIG. 1.

As shown in FIGS. 1 to 4, the "multi-directional hairline" may be a complex pattern of multiple multi-directional hairlines formed at a desired angle with respect to the length direction of the base film. That is, the "multi-directional hairline" may be a hairline pattern formed in one direction (the width direction or other direction of the base film), or a complex pattern having a combination of multiple the hairline patterns. In the complex pattern, the formation directions of the hairline patterns may be equal to or different from each other. For example, the "hairline pattern" may be the complex pattern in which the one directional hairline parallel with the length direction of the base film may be formed on a part of the base film, and the multi-directional hairline may be formed at other part of the base film so as to be placed at various angles of more than 0° to less than 360° with respect to the length direction of the base film.

Figure 6:
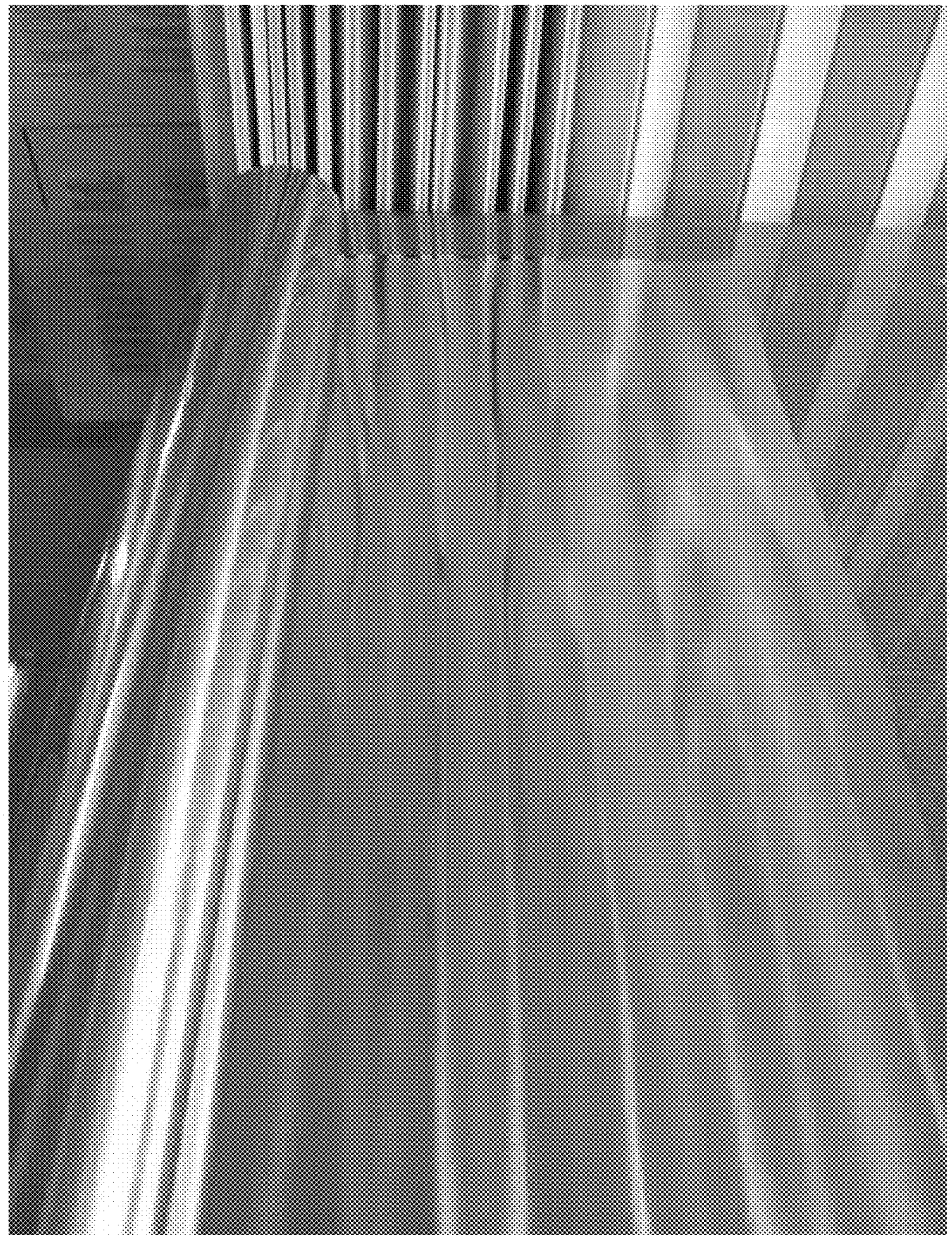
FIG. 6 is a photograph of an interior film having a non-directional hairline pattern according to an embodiment of the present invention.
Figure 7:
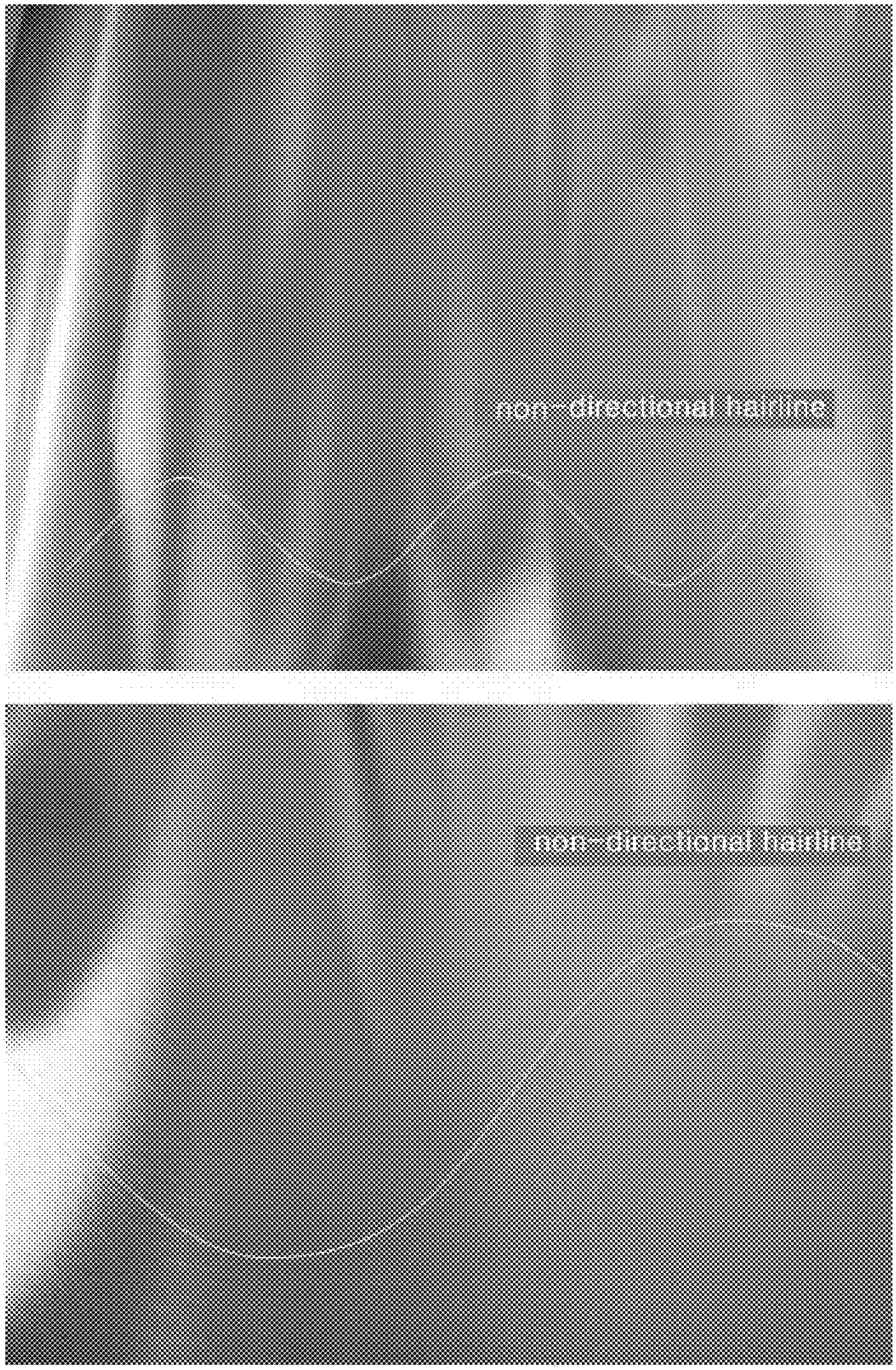
FIG. 7 is a partially enlarged photograph of FIG. 6.

FIG. 6 is a photograph of an interior film having a non-directional hairline pattern according to an embodiment of the present invention, and FIG. 7 is a partially enlarged photograph of FIG. 6. As shown in FIGS. 6 and 7, the "non-directional hairline" means a pattern that the hairline is formed into a curved shape (e.g., a wave pattern of FIG. 7), but not linear shape. At this point, the hairline may include a wave shape, an elliptical shape and the other shapes.

Further, the "circular hairline" is a pattern in which a fine scratch is formed into a circular shape, and the circular shape may have various sizes.

In the present invention, a method of forming the various patterns is not limited particularly. For example, using an abrasive material having a fine abrasive member, the surface of the film or the primer layer formed on the film may be scratched in a predetermined direction, or a correspondent pattern is formed in a mold and then transferred on the film, as described later, thereby forming a desired pattern on the film.

Further, as shown in FIGS. 1, 2, 3 and 5, the "mirror pattern" means a pattern which the surface of the base film is formed like a mirror so as to provide a mirror effect. In the present invention, a method of forming the mirror pattern is also not limited particularly. For example, using an abrasive material formed of fine-sized (e.g., nano-scaled) abrasive particles, the surface of the film or the primer layer formed on the film may be scratched, or a correspondent pattern is formed in a mold and then transferred on the film, as described later, thereby forming a desired pattern on the film.

Figure 2:
FIGS. 2 to 5 are partially enlarged photographs of FIG. 1.
Figure 3:
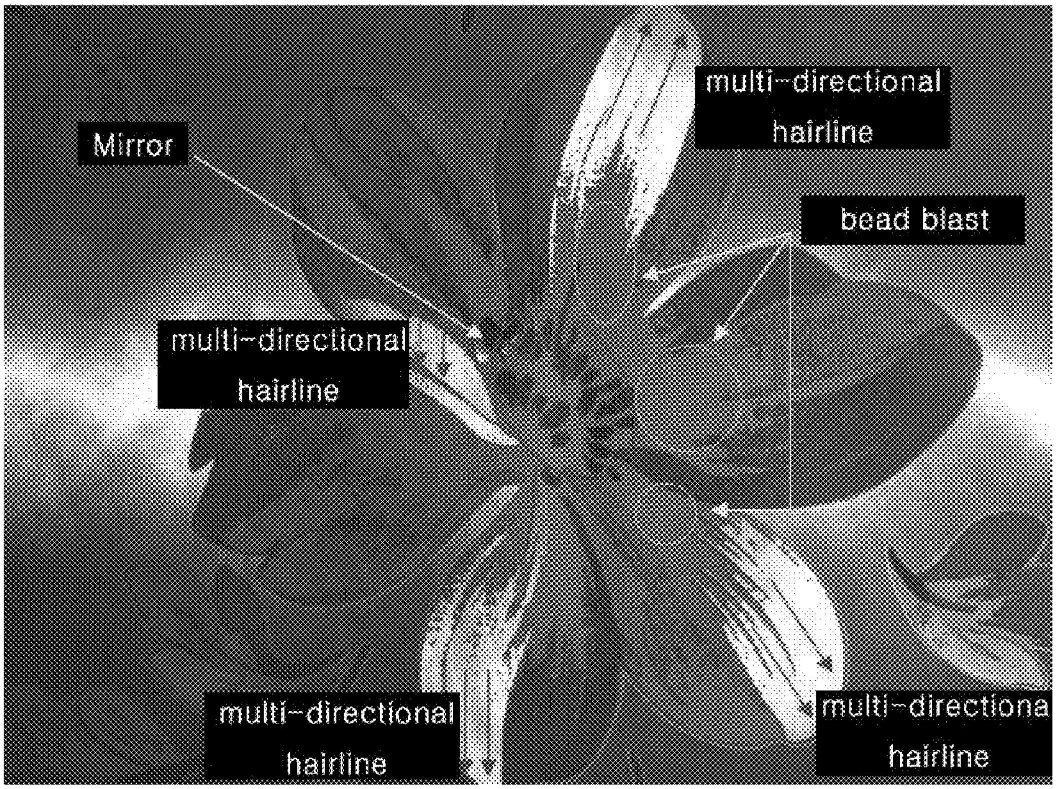
Figure 4:
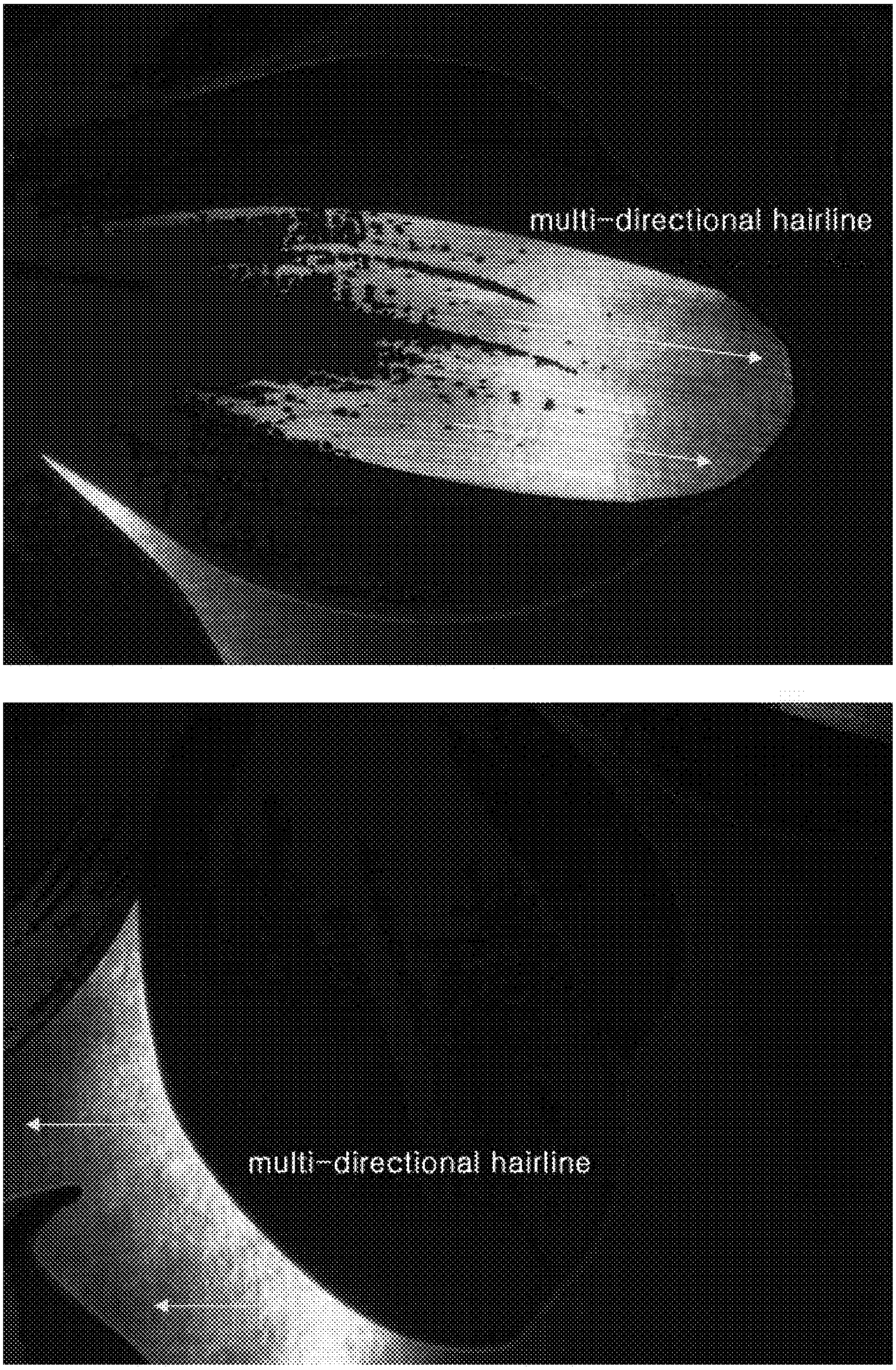
Figure 5:
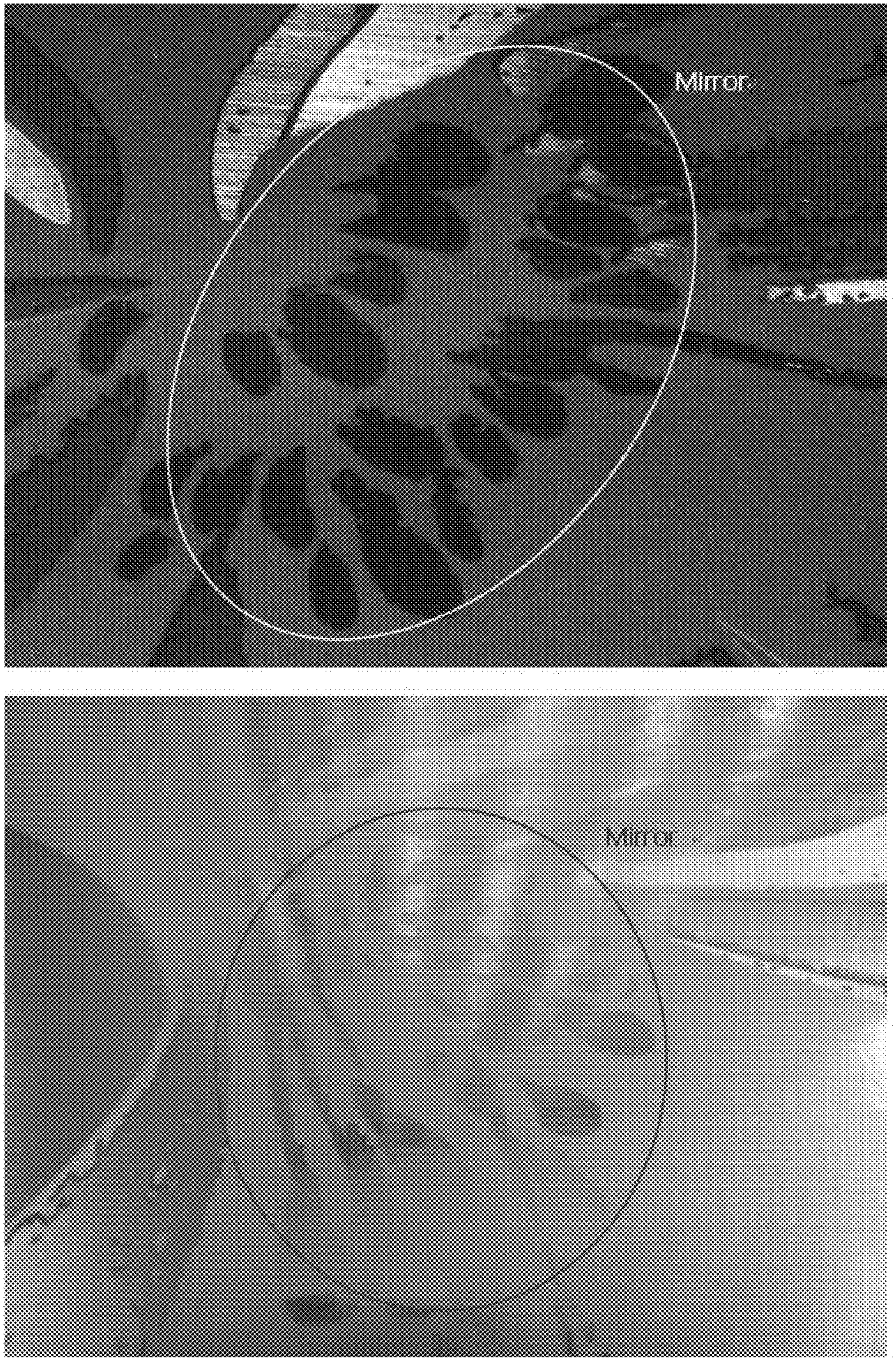

Further, as shown in FIGS. 1 to 3, the "bead blast pattern" used in the present invention means a fine uneven pattern formed by bead blasting. Herein, the "bead blasting" is a process that forms the fine uneven pattern by injecting beads at a desired pressure onto a substrate, and it is possible to provide various feelings according a material, a size, an injection pressure and speed of the bead. In the present invention, the bead blast pattern is formed by scattering the beads on the surface of the film or the primer layer formed on the film using a device for scattering the beads selected for a desired pattern on the film, or a correspondent pattern is formed in a mold and then transferred on the film, as described later, thereby forming a desired pattern on the film.

Further, the "fine uneven pattern" used in the present invention means a pattern that is formed by pressing using a mold in which an uneven portion is formed by etching or machining. In this case, the fine uneven pattern typically has a depth deeper than the hairline pattern. The fine uneven pattern may be formed on the surface of the film or the primer layer formed on the film by a mechanical manner using a fine needle, or a correspondent pattern is formed in a mold and then transferred on the film, as described later, thereby forming a desired pattern on the film.

Further, the "vibration pattern" means a pattern which is formed by rotating a vibrator header which is rapidly moved up and down. Herein, it is possible to form various patterns according to a period of rotation and revolution of the vibrator header. The vibration pattern may be also formed by the above-mentioned method, or a correspondent pattern is formed in a mold and then transferred on the film, as described later, thereby forming a desired pattern on the film. Meanwhile, the vibration pattern is similar to the circular hairline pattern, but is not formed into a completely circular shape. The vibration pattern may be formed into a non-completely circular shape such as a semicircular shape and three-quarters of a circle.

Preferably, the pattern such the hairline pattern, the etching pattern, the vibration pattern and the bead blast pattern has a depth of 1~10 μm, more preferably 1~5 μm. As the result, it is possible to provide the effect of metallic feeling, for example, similar to stainless steel, due to a regular and irregular reflection of light. Further, in case of the hairline pattern, it is preferable that a width between the patterns is 1~50 μm. However, if necessary, the depth of the pattern and the width of the hairline may be changed variously.

In the interior film of the present invention, a metal layer may be further formed on the pattern layer so as to provide a metallic color. In this case, it is possible to provide the effect of metallic feeling more similar to a metal material. The metal layer may include aluminum, stainless, copper, gold, silver, nickel, chrome, cobalt or the like, but it may be changed variously according to the effect of the metallic feeling to be embodied. The metal layer may be formed of only a single one, or a mixture of two or more kinds of metal materials. In some cases, the metal material in the form of an oxide or alloy of two or more kinds of metals may be contained in the metal layer.

A method of forming the metal layer is not limited particularly. For example, the metal layer may be formed by vacuum thermal depositing or sputtering using the above mentioned metals. Herein, conditions of the vacuum thermal deposition or sputtering are not limited particularly. Further, a thickness and light transmittance of the metal layer are not limited particularly, and they can be properly selected according to the purpose of use.

The interior film of the present invention may further include a surface coating layer formed on the base film. The surface coating layer functions to protect the surface of the film from the external environment, and also to protect the pattern formed on the base film when the interior film is laminated on a third material such as iron plate, a lumber and an aluminum plate. In the present invention, a material and a manufacturing method of the surface coating layer are not limited particularly. For example, the surface coating layer may be formed by a general method using a typical material such as a polyurethane resin, polyvinyl resin, an acrylic resin and a mixed resin of two or more kinds thereof. A thickness of the surface coating layer is not limited particularly. However, it is preferable that the surface coating layer has a thickness of 1.0~50 μm, more preferably 1.0~20 μm in consideration of workability, productivity and surface protecting effect. In the present invention, in order to enhance adhesive durability between the base film and the surface protective layer, a primer layer may be further provided between the base film and the surface coating layer The interior film of the present invention may further include an adhesive layer or a viscous layer formed at a lower side of the base film. By forming the adhesive layer or the viscous layer, the interior film of the present invention can be laminated on other material such as a lumber, a plastic sheet, a metal plate and glass.

The adhesive layer or the viscous layer used in the present invention is not limited particularly. The adhesive layer or the viscous layer may be formed of a general material such as acrylic, urethane, epoxy and rubber. A thickness of the adhesive layer or the viscous layer is not also limited particularly. For example, the adhesive layer or the viscous layer may have a thickness of 1~50 μm, preferably 5~20 μm.

As described above, a method of manufacturing the interior film of the present invention is not limited particularly. That is, the interior film of the present invention can be manufactured by any methods used in the field.

For example, the manufacturing method of the interior film of the present invention may include a first process of forming in a mold one or more patterns selected from the group consisting of the hairline pattern, the mirror pattern, the bead blast pattern, the fine uneven pattern, the etching pattern and the vibration pattern; and a second process of transferring the pattern formed in the first process on a base film.

Herein, a method of forming the pattern in the mold and a kind of the mold are not limited particularly. A typical method and mold used in the field can be used in the present invention.

Further, a method of transferring the pattern formed in the mold on the base film (or a primer layer formed on the base film) is not also limited particularly. The transferring method may be properly selected according to the kind of the base film.

The interior film of the present invention can be applied to a surface of a home appliance, an interior/exterior material for a building, an advertising board and the like.

According to the present invention, various patterns such as the multi-directional, non-directional or circular hairline pattern; the fine uneven pattern; the mirror pattern; the etching pattern; the vibration pattern; the bead blast pattern and the like are directly formed on the plastic film. Therefore, in the present invention, it is possible to provide the interior film having the effect of metallic feeling similar to an actual metal. Further, the interior film of the present invention can be facilely laminated to an iron plate, an aluminum plate, a lumber or a plastic film, and thus effectively applied to a home appliance, an interior/exterior material for vehicle, a building (an inner portion of an elevator, an inner wall of a room and the like) or furniture, door and an advertising board and the like.

While the present invention has been described with respect to the specific embodiments, it will be apparent to those skilled in the art that various changes and modifications may be made without departing from the spirit and scope of the invention as defined in the following claims.

What is claimed is:

1. An interior film comprising:

a base film wherein the base film is one or more films selected from the group consisting of polyester film, polymethyl methacrylate film, polyvinyl chloride film, polyvinyliden fluoride film and ABS (Acrylate-Butadien-Styrene) film;

a pattern layer formed on one surface of the base film, the pattern layer comprises a hairline pattern and one or more patterns selected from the group consisting of mirror pattern, bead blast pattern, uneven pattern, etching pattern and vibration pattern, and an adhesive layer formed on the other surface of the base film which is opposite to the pattern layer, wherein the hairline pattern is a complex pattern having one or more patterns selected from the group consisting of multi-directional pattern, non-directional pattern and circular hairline pattern, wherein the pattern formed in the pattern layer has a depth of 1-5 μm, wherein the hairline pattern has a width between the hairlines of 1-50 μm, wherein the multi-directional pattern is a hairline pattern that the hairline is formed at various angles from more than 0° to less than 360° with respect to the length or longitudinal direction of the base film, wherein the non-directional pattern is a hairline pattern that the hairline is formed into a curved shape, and where the circular hairline pattern is a hairline pattern that the hairline is formed into a circular shape.

2. The interior film of claim 1, wherein the base film has a thickness of 0.023-0.5 mm.

3. The interior film of claim 1, further comprising a metal layer formed on the pattern layer.

4. The interior film of claim 3, wherein the metal layer comprises one or more metals selected from the group consisting of aluminum, stainless, copper, gold, silver, nickel, chrome and cobalt.

5. The interior film of claim 1, further comprising a surface coating layer formed on the base film.

6. The interior film of claim 5, wherein the surface coating layer comprises one or more resins selected from the group consisting of polyurethane resin, polyvinyl resin and acrylic resin.

7. The interior film of claim 5, wherein the surface coating layer has a thickness of 1.0-50 μm.

8. The interior film of claim 1, wherein the adhesive layer has a thickness of 1-50 μm.

* * * * *